(12) United States Patent
Sörgel

(10) Patent No.: US 6,438,534 B1
(45) Date of Patent: Aug. 20, 2002

(54) PROCESS AND SYSTEM FOR COMMISSIONING INDUSTRIAL PLANTS, IN PARTICULAR IN THE PRIMARY INDUSTRY

(75) Inventor: Günter Sörgel, Nürnberg (DE)

(73) Assignee: Siemens Aktiengesellscaft, Munich (DE)

( * ) Notice: Subject to any disclaimer, the term of this patent is extended or adjusted under 35 U.S.C. 154(b) by 0 days.

(21) Appl. No.: 09/202,670

(22) PCT Filed: Jun. 20, 1997

(86) PCT No.: PCT/DE97/01285

§ 371 (c)(1),
(2), (4) Date: Aug. 16, 1999

(87) PCT Pub. No.: WO97/50021

PCT Pub. Date: Dec. 31, 1997

(30) Foreign Application Priority Data

Jun. 21, 1996 (DE) .......................................... 196 24 926

(51) Int. Cl.[7] ........................... G06F 15/18; G05B 13/02
(52) U.S. Cl. ............................... 706/61; 706/45; 700/48
(58) Field of Search ............................... 706/61, 15–44, 706/45; 700/48; 340/3.52, 825.22, 825.52

(56) References Cited

U.S. PATENT DOCUMENTS

| 4,472,783 A | * | 9/1984 | Johnstone et al. ........... 700/182 |
| 4,819,149 A | | 4/1989 | Sanik et al. .................... 700/3 |
| 5,088,045 A | * | 2/1992 | Shimanaka et al. ......... 700/110 |

(List continued on next page.)

FOREIGN PATENT DOCUMENTS

| DE | 40 19 395 A1 | 12/1991 |
| DE | 44 13 836 A1 | 10/1995 |
| DE | 195 08 476 A1 | 9/1996 |
| EP | 0 607 492 A2 | 7/1994 |
| WO | WO 95/14277 | 5/1995 |
| WO | WO 96/02025 | 1/1996 |

OTHER PUBLICATIONS

Davis et al.; "Recent Advances in the Modeling, Scheduling and Control of Flexible Automation". Proceedings of the Conference on Winter Simulation, Oct. 1993, p. 143–155.*
Pratt et al.: "Interpolation, Wavelet Compression, and Neural Network Analysis for Hazardous Waste Characterization". IEEE International Conference on Systems, Man and Cybernetics, Oct. 1995, vol. 3, p. 2058–2063.*
Turner et al.; "Neural Networks in Process Plant Modelling and Control". Computing and Control Engineering Journal, Jun. 1994, vol. 5, Iss. 3, p. 131–134.*
Bossard et al.; "Learning Algorithm Improvements of a Neural Network based Tuning Method for Robot Controller". 20th International Conference on Industrial Electronics, Control and Instrumentation, Sep. 1994, vol. 2, p. 1253–1258.*

(List continued on next page.)

Primary Examiner—Thomas Black
Assistant Examiner—Kelvin Booker
(74) Attorney, Agent, or Firm—Bell, Boyd & Lloyd LLC

(57) ABSTRACT

A method and system for commissioning industrial plants, in particular in the basic materials industry, having a plant control system which carries out both non-control functions and control functions and whose control system operates with process models, in particular control engineering models, for example in the form of mathematical models, neural network models, expert systems etc., in a control system computing unit. The commissioning is carried out in subdivided fashion into commissioning the non-control functions with extensive initialization of the control functions, by means of personnel located on site, and extensive commissioning of the control functions by means of remotely-transmitted data via data lines from at least one site remote from the plant, preferably from an engineering center.

18 Claims, 5 Drawing Sheets

U.S. PATENT DOCUMENTS

| | | | | | |
|---|---|---|---|---|---|
| 5,172,312 | A | * | 12/1992 | Lino et al. | 364/149 |
| 5,195,026 | A | * | 3/1993 | Nonaka et al. | 700/47 |
| 5,291,416 | A | | 3/1994 | Hutchins | 700/174 |
| 5,347,446 | A | * | 9/1994 | Lino et al. | 364/149 |
| 5,397,514 | A | * | 3/1995 | Breil et al. | 264/40.1 |
| 5,432,887 | A | * | 7/1995 | Khaw | 706/19 |
| 5,513,097 | A | * | 4/1996 | Gramckow et al. | 700/48 |
| 5,586,221 | A | * | 12/1996 | Isik et al. | 706/23 |
| 5,598,149 | A | * | 1/1997 | Schreiter et al. | 340/825.06 |
| 5,600,758 | A | * | 2/1997 | Broese et al. | 706/23 |
| 5,781,432 | A | * | 7/1998 | Keeler et al. | 700/44 |
| 5,796,920 | A | * | 8/1998 | Hyland | 706/20 |
| 5,796,921 | A | * | 8/1998 | Minamino et al. | 706/26 |
| 5,873,251 | A | * | 2/1999 | Lino | 60/660 |
| 6,049,738 | A | * | 4/2000 | Kayama et al. | 700/29 |
| 6,085,183 | A | * | 7/2000 | Horn et al. | 706/45 |
| 6,089,021 | A | * | 7/2000 | Senanayake | 60/641.12 |
| 6,263,260 | B1 | * | 7/2001 | Bodmer et al. | 700/275 |

OTHER PUBLICATIONS

Kim et al.; "Fuzzy Modeling, Control and Optimization of Textile Process". Fuzzy Information Processing Society Biannual Conference, 1994.*

Li et al.; "Constrained Predictive Control Using Neural Network". Proceedings of the IEEE International Symposium on Industrial Electronics 1992, May 1992, vol. 1, p. 261–266.*

Madsen, P.; "Neural Network for Optimization of Existing Control Systems". Proceedings of IEEE International Conference on Neural Networks, 1995, Dec. 1995, vol. 3, p. 1496–1501.*

Hyland, D.; "Neural Network Architecture for Online System Identification and Adaptively Optimized Control". Proceedings of the 30$^{th}$ IEEE Conference on Decision and Control, 1991, vol. 3, p. 2552–2557.*

Highlights of the GURI Hydroelectric Plant Computer Control System, Beltran et al., pp. pp. 4–8, Jul. 1988.

* cited by examiner

PROCESS AND SYSTEM FOR COMMISSIONING INDUSTRIAL PLANTS, IN PARTICULAR IN THE PRIMARY INDUSTRY

BACKGROUND OF THE INVENTION

1. Field of the Invention

The present invention relates to a method and system for commissioning industrial plants, in particular in the basic materials industry, having a plant control system which carries out both non-control functions and control functions and whose control system operates with process models, in particular control engineering models, for example in the form of mathematical models, neural network models, expert systems etc., in a control system computing unit 2. Description of the Prior Art In the control of industrial plants, in particular plants which proceed with very rapid processes, very slow processes, processes which run in leaps and bounds, or processes do for which there is no suitable state sensors, operations are mostly carried out using control engineering models. As a rule, such plants have a basic automation system and a process management system (non-control and control). Experience shows that the commissioning of relatively large plants is very time-consuming and costly and requires specialists who are experienced in plant engineering. This also applies to the control engineering plant design and to the control project engineering of the individual components.

It is an object of the present invention, for plants of the type outlined above, in particular for plants in the basic materials industry, but also for plants in the chemical industry and for producing electrical power, to specify a commissioning method and a system suitable for this with which, given an optimum commissioning result, a reduction in time and costs can be achieved. In this case, the continuous operation of the plant which has been commissioned is intended to be able to be subsequently continually improved, and easily evaluable knowledge for the control project engineering and the design of corresponding plants are to be obtained. In summary, the aim can be described as reducing the engineering costs with a simultaneous improvement in the plant function.

SUMMARY OF THE INVENTION

The objects achieved in that the commissioning is carried out subdivided fashion into commissioning the non-control functions, with extensive initialization of the control functions, by means of personnel located on site, and extensive commissioning of the control functions by means of remotely-transmitted data via data lines from at least one site remote from the plant, preferably from an engineering center. As a result of this subdivision of the commissioning into a so-called basic commissioning is and an engineering commissioning, it is advantageously possible to dispense with having to use control engineering specialists, in particular specialists for the setting of parameters and improvement of control engineering models, on site. The commissioning costs thus can be reduced considerably. Furthermore, the commissioning can be carried out more rapidly and more reliably since, for the engineering commissioning, a specialist team can be made available to whom all the aids of an engineering center and external consultants are available.

It is already known to equip PCs by means of programs which are input into the PC via data transmission. Furthermore, the diagnosis of PCs as well as of individual automation devices, such as machine-tool controllers or programmed logic controllers, for example, is known. The known procedure for the equipment, diagnosis and functional improvement of individual devices cannot, however, be transferred to the commissioning of entire plants, in particular entire plants which are as complex as those in the basic materials industry. For this purpose, learning routines are just as necessary as the use of the computing intelligence of the plant, long access times and a dialog in the sense of "trial and error". This was previously held to be impossible to implement to the extent necessary.

In a refinement of the present invention, it is contemplated that engineering optimization is carried out while commissioning the control functions. The optimization is preferably carried out "step by step" under remote influence in at least one control system computing unit of the plant. That is, the individual optimization steps run on a computing unit of the process control system so as to avoid those problems which can result in the case of taking over an optimization step carried out on an external computing unit into the computing unit of the control system. From the point of view of the complexity of the programs in the plant control systems, software errors would otherwise always be expected in taking over optimized program parts. The avoidance of implementation problems is a considerable advantage of the system according to the present invention.

In addition to remote commissioning, remote functional improvement and remote optimization of the control part, provision is also made a remotely-influenced improvement of the non-control part. Even the basic automation of an industrial plant is so complex nowadays that the remote optimization according to the present invention is worthwhile. In this case, the appropriate level of the plant control system is advantageously used.

Following the commissioning of the control functions with the initial optimization, a further improvement of plant operation is carried out continuously by means of engineering optimization with the aid of the engineering center. It is thus ensured that the plant is further operated in an optimum manner in control engineering terms. This is important, in particular, in the case of changes in the product program; for example, as the result of accepting further material grades into the product program.

The optimization relates, in particular, to setting parameters for models, such as those in the form of algorithms or artificial neural networks (ANN), and to further development of the algorithms of the models or of the design of the ANN, and of expert knowledge evaluated by computer; for example, in the form of limiting curves, etc. Thus, the most important modules of a model-based controller can be continuously improved in order to achieve optimum plant behavior.

Provision is advantageously made that, in the case of using neural networks as process models, the adaptation takes place in parallel with network training. Thus, account is taken particularly well according to the present invention of the properties of artificial neural networks (ANN). They are always in the state which is most advantageous for the optimization. It is furthermore of particular advantage if the artificial neural networks (ANN) are used for the improvement of algorithms and/or models, and if in so doing a closed loop is formed which is designed as a directly closed loop in a control system computing unit or as a loop which is closed indirectly via the engineering center. In particular, the loop which is closed via the engineering center in this case ensures that the newest control knowledge and computing knowledge can always be included in the optimization and improvement of parameters and/or models. In this case, it is advantageously also provided that the further development of models is carried out with the aid of an evolution strategy, for example via genetic algorithms. It is thus also possible for any necessary further devel the models to optimize the plant behavior and, if appropriate, also to optimize the plant itself.

In order to carry out the method in an advantageous manner, a commissioning or plant operational improvement system is provided which has at least one engineering center installed remote from the plant—in particular a commissioning and/or operational improvement center—which is connected via remote data transmission means to at least one control system computing unit of a plant which is to be commissioned in engineering terms or to be improved further in engineering terms. By this means, the advantages of the method of the present invention may be achieved.

In an embodiment of the present invention, it is provided that THE system has, in an engineering center, an internal network which is preferably equipped as an Ethernet with twisted-pair connections, having at least a 10 megabit per second transmission speed, which preferably operates according to the TCP-IP protocol. This results in a secure internal network which can be implemented in a cost-effective manner and which has all the properties which are necessary for a remote commissioning and optimization center. The system furthermore has a remote commissioning or operational improvement network connected to the internal network for communication with industrial plants which has known, conventional data transmission components (ISDN, telephone, modem, Internet connections) and is connected to the engineering center by means of at least one security data transfer device (firewall). Thus, using conventional cost-effective components, the construction of a remote commissioning network, which has a construction necessary for reliable operation of the plant and for defense against operational espionage actions etc., is possible.

In an embodiment, the system has, in the region of the engineering center, external sites, for example project offices, which are physically separate but connected in terms of data, for example via ISDN lines, to said center and, together with the latter, form the engineering expertise. The discussion and/or solution of optimization tasks by external specialist personnel is thus possible whose teams, etc. are included in the engineering expertise. In this case, the cooperation of completely different teams is possible.

In a further embodiment of the present invention, it is provided that the commissioning or operational improvement center has an administrator unit, in particular having evaluation software for collected data, and is simultaneously designed to be suitable for logbook maintenance. For the purpose of optimization, in particular of operating points and specific operational steps, it is necessary to track the effects of control interventions in the case of earlier optimization measures. This is advantageously possible by means of the method according to the present invention.

For ISDN and Internet connections, there are routers provided which set up the desired connections. With the aid of these routers, which optionally operate automatically, the connection which is optimum in each case can be set up for the dialog between the operators of the individual plant components and the components of the engineering center, and for the connection between the individual computing units. Depending on the day of the week and the time of day, these may be different.

In order to carry out the present invention, there are in the control system of the plant computing engineering modules, a data collection unit etc., and in the center personnel with engineering knowledge, databases for the respective clients, general and client-specific engineering modules, in particular in a form which can be input like modules into the plant control system. Stepwise improvement with simple input of the new data into the overall system is thus possible.

Provided in the plant control system are computing devices for the adaptation of plant-specific parameters, for the storage of models designed specifically for the plant, for the storage of prior calculation algorithms, for the storage of trend sequences and for the storage of adaptation algorithms. The plant control system is thus able to carry out the engineering optimization in accordance with the predefinitions of the engineering center.

Provision is also made that for neural networks such as are often used for example in rolling mills or in electric-arc ovens, that is to say in the basic materials industry, optimization and training are carried out in parallel. For this, specifically designed software modules are present. Likewise, diagnostic memories and further computing devices are required for the engineering optimization of the plant. These software-controlled computing devices can be influenced via the data transmission means which are used in accordance with the present invention.

The hardware and software devices of the commissioning or operational improvement center include both nonspecific hardware devices, software tools, commissioning tools, software development tools, software evolution tools, ANN training tools, statistical evaluation programs, etc. and also special plant-specific software tools. Recourse is made as far as possible to plant-neutral modules wherein plant-specific and specially developed modules are only used when it is necessary.

The communication and optimization system for plant engineering optimization which is present according to the present invention is, in particular, designed to be capable of dialog and advantageously has, optical acquisition components both for the personnel handling it and for the plant parts optimized or to be diagnosed. It is therefore possible for optimization proposals, change proposals, diagnoses etc. to be carried out in a manner which largely corresponds to the presence of the specialists on site. It is, therefore, no longer personnel who travel but information. The commissioning center and the plant, as well as the plant control station, therefore advantageously have monitors and cameras. The same applies to external sites of the engineering center, for example project offices or specific software development units, so that it is actually possible to operate as though all the personnel involved in the optimization and the further development were located at one site, in particular at the site of the plant. This is of considerable advantage, in particular when working with artificial neural networks (ANN, as well as neuro-fuzzy and fuzzy applications), in which uniform handling is necessary from the collection of the training data up to the output of new parameters.

DESCRIPTION OF THE DRAWINGS

Additional features and advantage of the present invention are described in, and will be apparent from, the Detailed Description of the Preferred Embodiments and the Drawings.

DETAILED DESCRIPTION OF THE PREFERRED EMBODIMENTS

Figure 1:
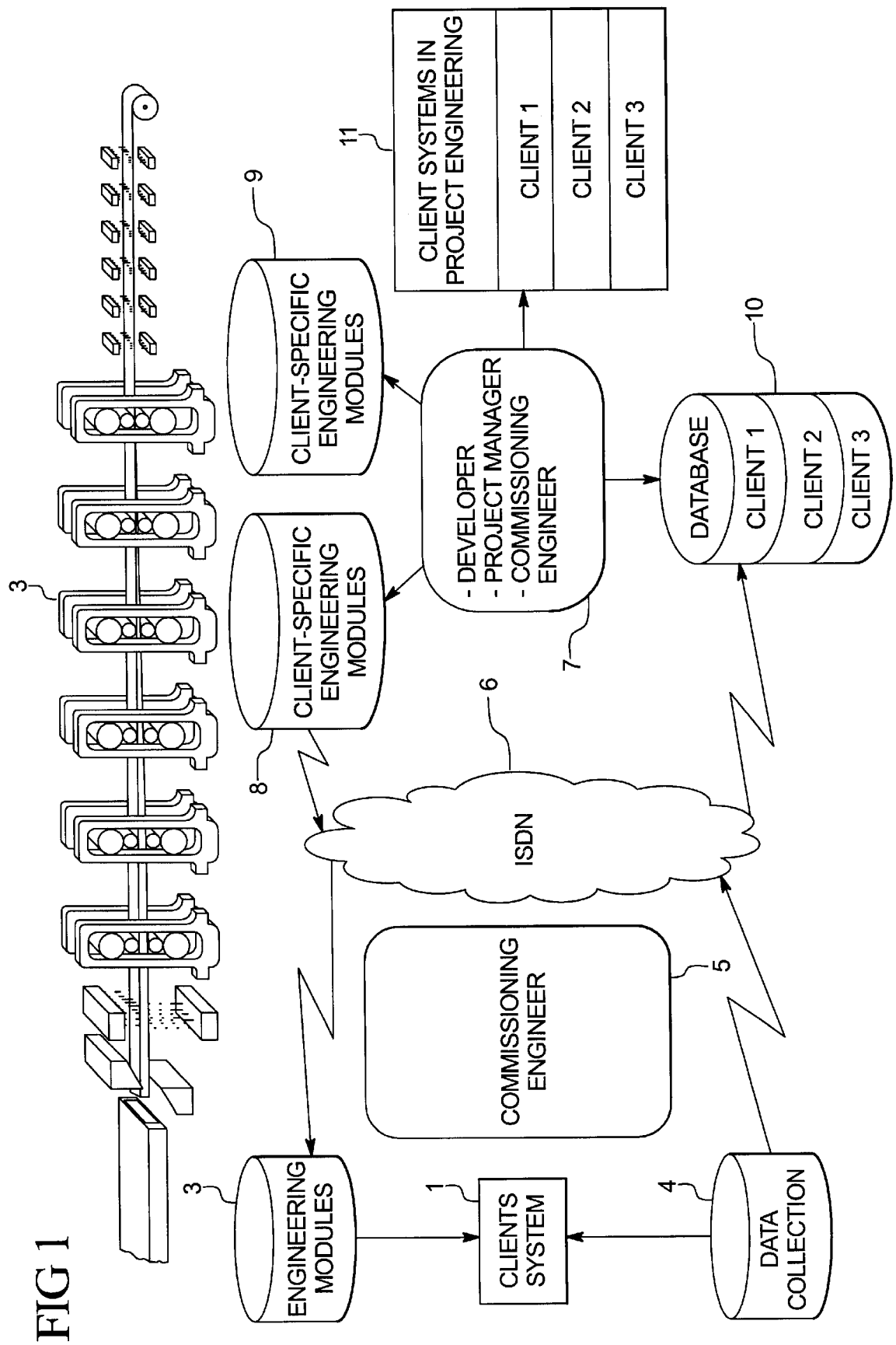
FIG. 1 shows a detailed symbolic illustration of the principle of the present invention.

In FIG. 1, 1 denotes the control system of the client, which contains the engineering module 3 and a data collection 4. The control system of the client is commissioned by commissioning engineers 5. In reality, there is a team of commissioning engineers on site. Via the transmission plane 6, which is illustrated as a bubble and ISDN connections, in particular having ATM components for image transmission, but also having telephone modems or the Internet, components 1, 3, 4 and 5 which serve, for example, for commissioning a rolling mill 2, are connected to the components 7 to 11. The components 7 to 11 are the components in or connected to the energy center with its personnel 7. In the engineering center are general engineering modules 9, client-specific engineering modules 8, a database 10 for various clients and project engineering components 11 for different clients, as well as further components which can be inferred in their details from the description. The separation of the components located on site and the components in or connected to the engineering center is clearly visible. In contrast to the known diagnostic or equipment routines, this is not a connection which is closely limited in time, but a relatively permanent connection of the components which are on site and in the engineering center. The components which are connected to the engineering center do not, in this case, need to be physically concentrated; instead they extend, if necessary, to different continents. Because of the time shift, there is an optimization, consultancy and diagnostic procedure at the client which under certain circumstances takes place 24 hours per day. Plants in the basic materials industry, in chemistry and in energy production are certainly also constructed in such a way that they enable continuous 24-hour operation.

The plant itself advantageously always remains autonomously serviceable since it is only the intelligence present at the plant which is further improved. Interruption to the line or satellite connections between the plant and the engineering center therefore have no effect on the production. The individual optimization steps are only carried out later.

Figure 2:
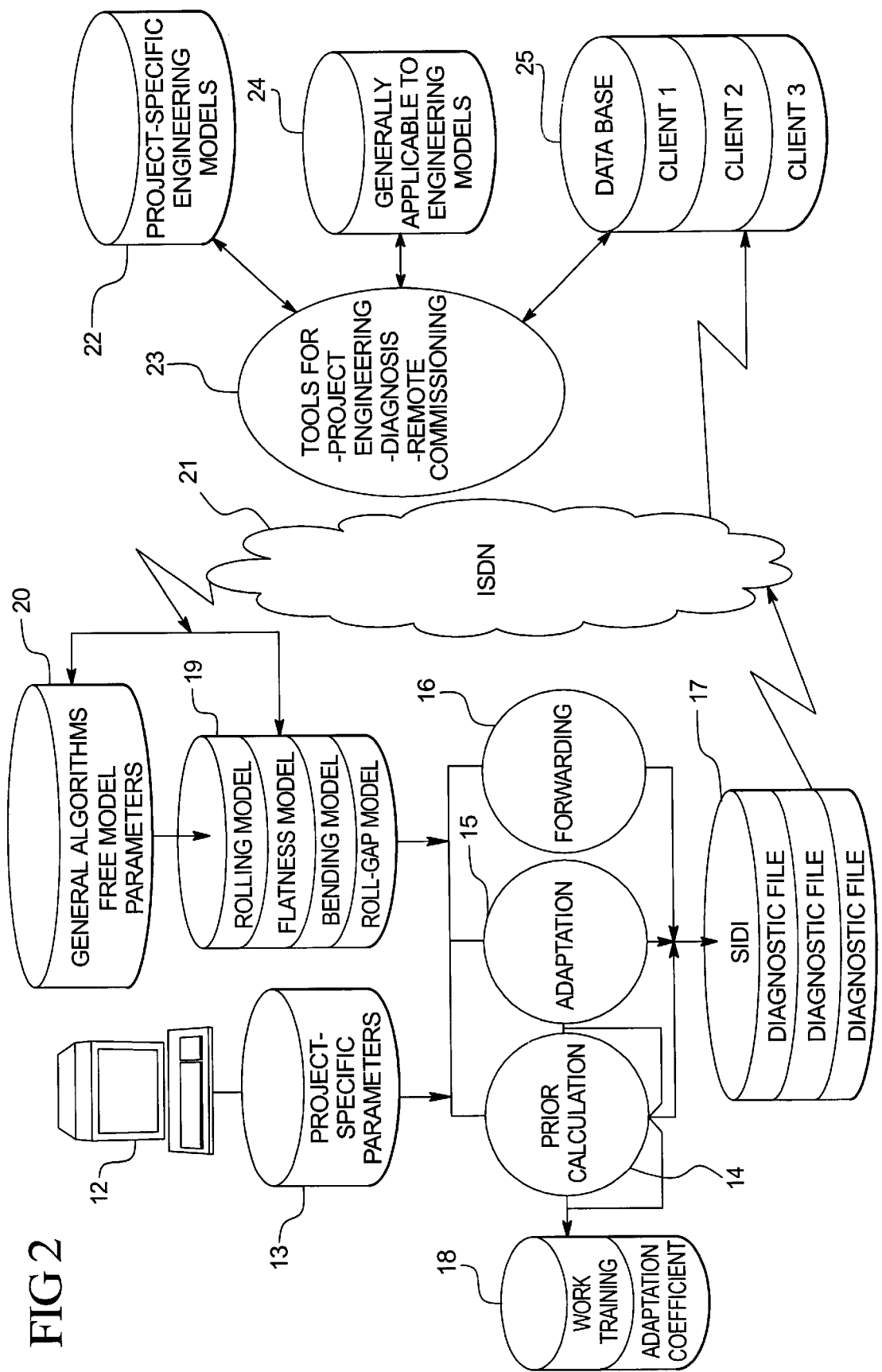
FIG. 2 shows the significant parts of the engineering center of the present invention in a symbolic illustration.

In FIG. 2, 12 denotes an input station for project-specific parameters 13 with which data from the client's plant, such data being optimized in control engineering terms in single-pass and in loops, are determined in a prior calculation unit 14, an adaptation unit 15 and a unit 16 which takes into account forwarding laws, with the aid of a network training unit 18 and a diagnostic part 17. In the case of a rolling mill, for example, operations are carried out with the models specified individually in 19, such as the rolling-force model, flatness model, bending model and roll-gap model, these are able to be further improved in the unit 20 by means of genetic algorithms and new model parameters. Together with the project-specific parameters from the unit 13, they make possible the optimization computing processes running in the units 14, 15 and 16. The generated data pass via the transmission plane 21, here ISDN stands symbolically for all data transmission means, into the database 25, which is divided up in a client-specific manner and where the data lead, with the aid of tools for project engineering, diagnosis from remote commissioning tools and generally valid engineering models, to engineering, project-specific models 22. The latter pass via the plane 21 into at least one computer unit of the client's control system.

Figure 3:
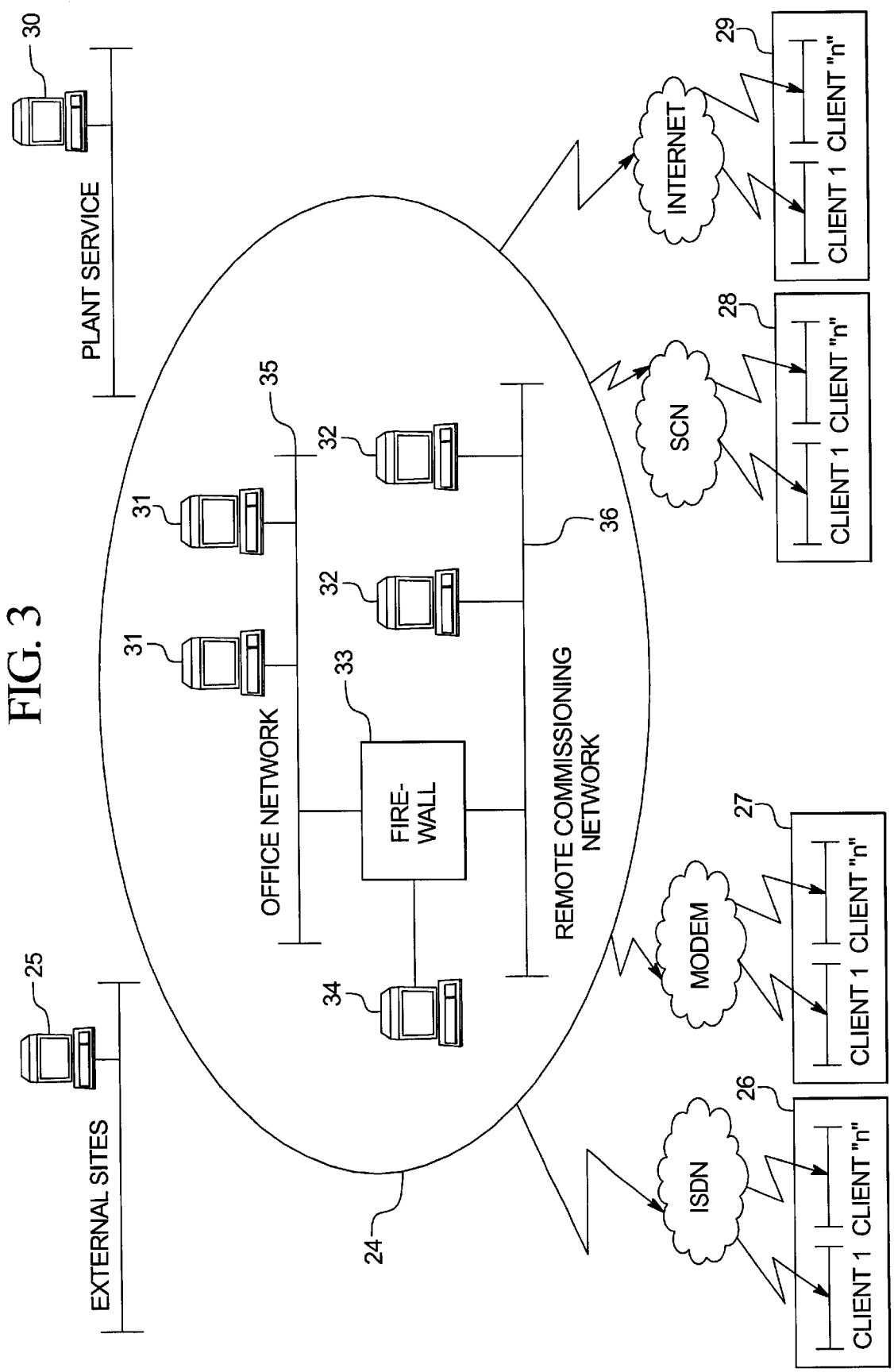
FIG. 3 shows the system of the present invention formed in a symbolic illustration.

FIG. 3 shows the core of the engineering center 24 with external sites 25. The core of the engineering center 24 is connected to clients 26 to 29, for which purpose various connecting means can be used. The abbreviation SCN in this case stands for companies' Intranets, which can be extended to specific clients. Furthermore, the core of the engineering center 24 is connected to plant service stations 30, in order to be able to give direct instructions to the regional service areas and to be able to evaluate their experiences. The core of the engineering center 24 has an office network with the computing units 31, which are connected to one another via a bus 35. Furthermore, computing units 32, which ensure the connection with the clients and likewise among themselves, are connected by a bus 36. Between the two buses 35 and 36 there is a firewall 33 with a monitoring station 34. The firewall 33 also prevents an unauthorized through-access to the internal office network being able to take place from outside. The internal network is advantageously an Ethernet with twisted-pair connections and advantageously has a transmission speed of 10 megabit/second. It operates, for example, with the TCP/IP protocol and may contain up to 3000 terminals. It is also possible to supply an entire department or an entire division of a company with the data of the internal network. In this case, an FDDI home ring with up to fifteen servers and a transmission speed of 100 megabit/second serves as the backbone. In this way, the data from workstations or true large computers, which are advantageous, for example, for the rapid training of neural networks, can advantageously be transmitted very rapidly. The cooperation of a large number of coworkers in the final stage of remote commissioning is also possible without difficulty in order to shorten the time.

A firewall is of importance in that no viruses or sabotage commands can be introduced. Suitable programs for firewalls are known; their updating and the monitoring for unauthorized accesses being carried out via station 34.

The programming within the framework of the plant-specific and general modules is advantageously partially carried out in an object-oriented manners for example, by means of the programming language C++, wherein a work flow system with case tools is able to be used.

Figure 4:
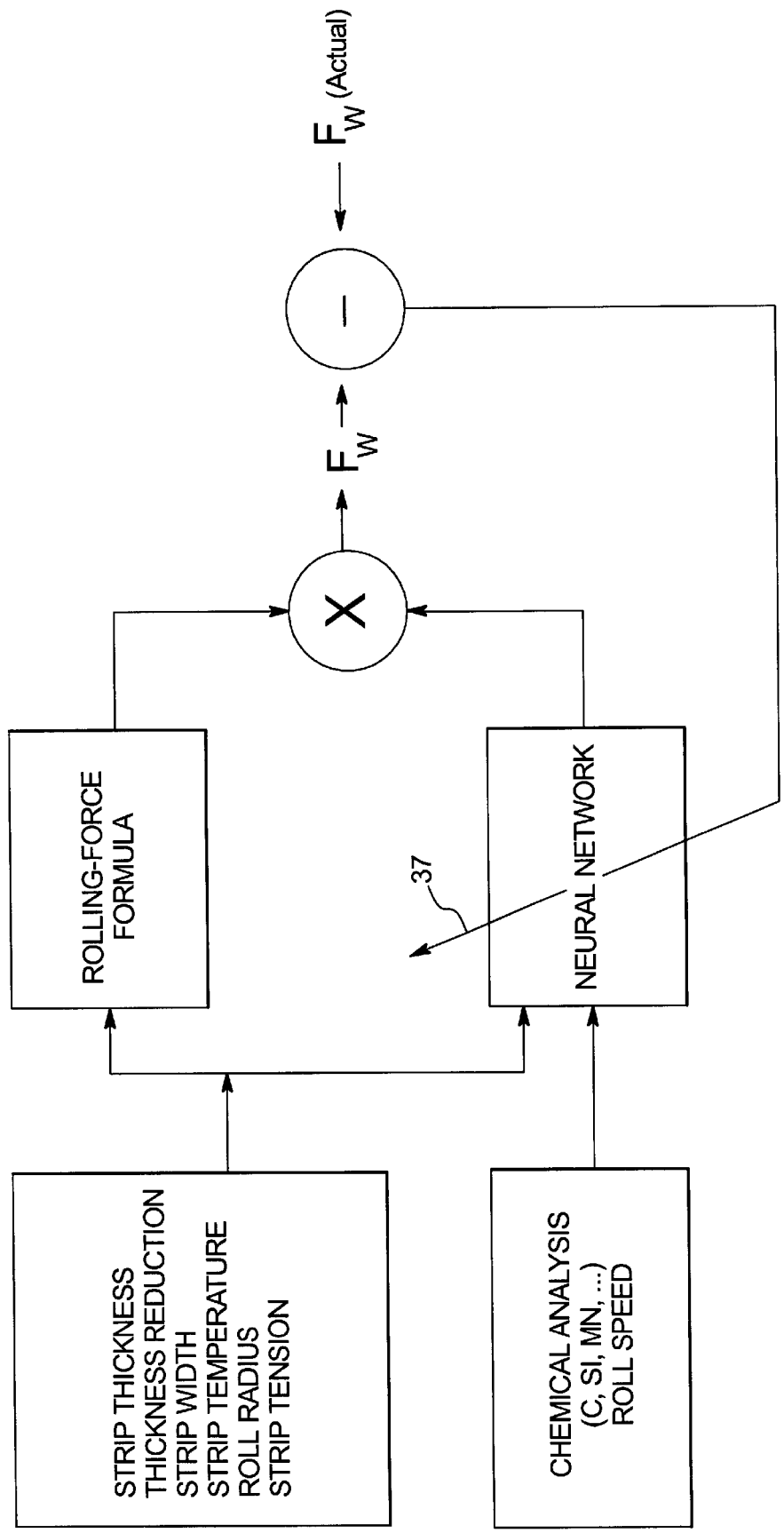
FIG. 4 shows an illustration relating to the optimization of a rolling process, with the use of a neural network for optimizing the rolling-force calculation.

FIG. 4 shows in schematic form, using the example of a rolling mill, the cooperation and training of a neural network with an algorithm for the rolling force. In this case, for example, the strip thickness, the thickness reduction, the strip width, the temperature, the roll radius and the strip tension are taken into account. These values are supplied both to the algorithm and to the neural network. Furthermore, the details of the chemical analysis and the roll speed are supplied to the neural network, and the values from the rolling-force algorithm and from the neural network are fed together in the point denoted by X. This results in a set point for the rolling force which is compared with the actual rolling force value. The difference is, in turn, supplied to the neural network as the feedback value so that an adaptive feedback loop results. The arrow 37 is intended to signify that an adaptation of the individual network weightings takes place, being carried out in accordance with the specified difference. This leads to a continuous adaptation of the behavior of the neural network in accordance with the actual behavior of the roll train in the case of the material currently being rolled. A "daily shape" of the roll train also can be taken into account in this way. The production results of the roll train are better than in the case of conventional control.

Figure 5:
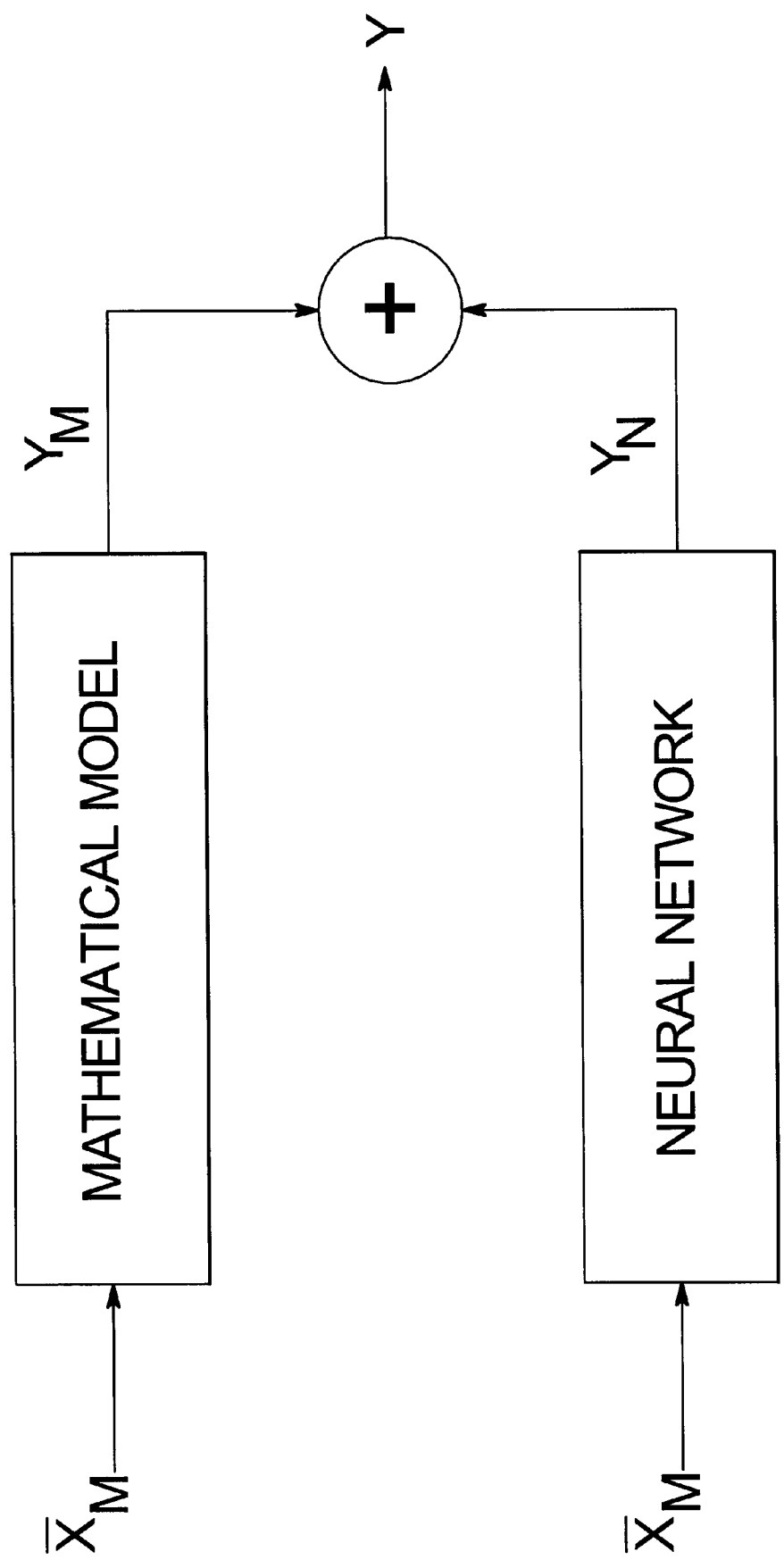
FIG. 5 shows a simple interaction of a mathematical model with a model in the form of a neural network.

FIG. 5 shows, finally, a forward-acting example of the interaction of a mathematical model (algorithm) with a neural network. Here, a simple additive improvement of the control variable generated takes place.

It goes without saying that, in addition to neural networks, further software modules, for example with expert knowledge, possibly with the aid of limiting curves, may be employed for managing the plant. This is carried out, in particular, for casting and smelting processes. The commissioning and engineering optimization method and system according to the present invention can in this case be used for different plants irrespective of the individual control engineering modules. However, it is particularly advantageous for a control technology which operates with the aid of neural networks.

Although the present invention has been described with reference to specific embodiments, those of skill in the art will recognize that changes may be made thereto without departing from the spirit and scope of the invention as set forth in the hereafter appended claims.

I claim:

1. A method for commissioning in sub-divided fashion industrial plants, in particular in the basic materials industry, having a plant control system with at least one non-control part for controlling and regulating the basic functions of the plant and with a technology-specific control part for influencing the quality of the manufactured product wherein the control part operates with control engineering models in a control system computing unit, the method comprising the steps of:

basic commissioning of the non-control part with extensive initialization of the control part by means of personnel located on site;

technological commissioning of the control part following the basic commissioning wherein model calculations for technological optimization are implemented by means of remotely-transmitted data via data lines from at least one site remote from the plant; and implementing an ongoing technological quality optimization after the technological commissioning.

2. A method for commissioning industrial plants as claimed in claim 1, wherein engineering optimization is carried out simultaneously with the step of technological commissioning.

3. A method for commissioning industrial plants as claimed in claim 2, wherein the engineering optimization is performed by means of optimizations which are carried out under remote influence in at least one control system computing unit of the plant.

4. A method for commissioning industrial plants as claimed in claim 2, wherein the engineering optimization is supplemented by remotely-influenced improvement of non-control functions.

5. A method for commissioning industrial plants as claimed in claim 2, wherein the engineering optimization relates to setting parameters for engineering models and to further development of the engineering models.

6. A method for commissioning industrial plants as claimed in claim 1, wherein an adaptation takes place in parallel with a network training when neural networks are used as the engineering control models.

7. A method for commissioning industrial plants as claimed in claim 6, wherein the neural network is used for the improvement of the engineering models, a closed loop being formed which is designed as one of a directly closed loop in a control system computing unit and an indirectly closed loop being closed indirectly via the site remote from the plant.

8. A method for commissioning industrial plants as claimed in claim 1, wherein further development of engineering models is carried out with the aid of an evolution strategy.

9. A commissioning or plant operational improvement system for industrial plants, in particular in the basic materials industry, the system comprising:

at least one non-control part for controlling and regulating the basic functions of the plant;

a technology-specific control part for influencing the quality of the manufactured product wherein the control part operates with control engineering models in a control system computing unit;

at least one engineering center installed remote from the plant, the engineering center connected via remote data transmission means to at least one control system computing unit of the plant; and wherein basic commissioning of the non-control part occurs with extensive initialization of the control part by means of personnel located on site, technological commissioning of the control part occurs following the basic commissioning wherein model calculations for technological optimization are implemented by means of remotely-transmitted data via data lines from the engineering center, and an ongoing technological quality optimization is implemented after the technological commissioning occurs.

10. A commissioning or plant operational improvement system as claimed in claim 9, wherein the engineering center includes an internal network equipped as an Ethernet with twisted-pair connections, having at least a 10 megabit per second transmission speed, which is designed to operate according to the TCP-IP protocol.

11. A commissioning or plant operational improvement system as claimed in claim 9, further comprising:

a remote commissioning network which has known, conventional data transmission components and which is connected to the engineering center by means of at least one security data transfer device.

12. A commissioning or plant operational improvement system as claimed in claim 9, wherein the engineering center has external sites which are physically separate yet connected in terms of data to the engineering center and which form the engineering expertise.

13. A commissioning or plant operational improvement system as claimed in claim 9, wherein the engineering center has an administrator unit and is designed to be suitable for log book maintenance.

14. A commissioning or plant operational improvement system as claimed in claim 9, further comprising:

a plurality of routers which set up desired connections for ISDN and Internet connections.

15. A commissioning or plant operational improvement system as claimed in claim 9, wherein the control part further includes computing engineering modules and a data collection unit, and wherein the engineering center further includes a personnel with engineering knowledge, data bases for respective clients and general and client-specific engineering modules.

16. A commissioning or plant operational improvement system as claimed in claim 9, wherein the control part further includes computing devices for the adaptation of plant-specific parameters, for the storage of models designed specifically for the plant, for the storage of prior calculation algorithms, for the storage of trend sequences and for the storage of adaptation algorithms.

17. A commissioning or plant operational improvement system as claimed in claim 9, wherein one of the control part and the engineering center further includes computer units for the training of neural networks and diagnostic stores, and further computing units necessary for the engineering optimization of the plant and can be influenced via one of remote data transmission means and internal data transmission means.

18. A commissioning or plant operational improvement system as claimed in claim 9, wherein the engineering center further includes non-specific hardware devices, software tools, commissioning tools, software development tools, software evolution tools, ANN training tools and statistical evaluation programs for plant-neutral use, and further includes special software tools for plant-specific use.

* * * * *